(No Model.)
J. LADNER.
Vehicle Wheel.
No. 234,589. Patented Nov. 16, 1880.
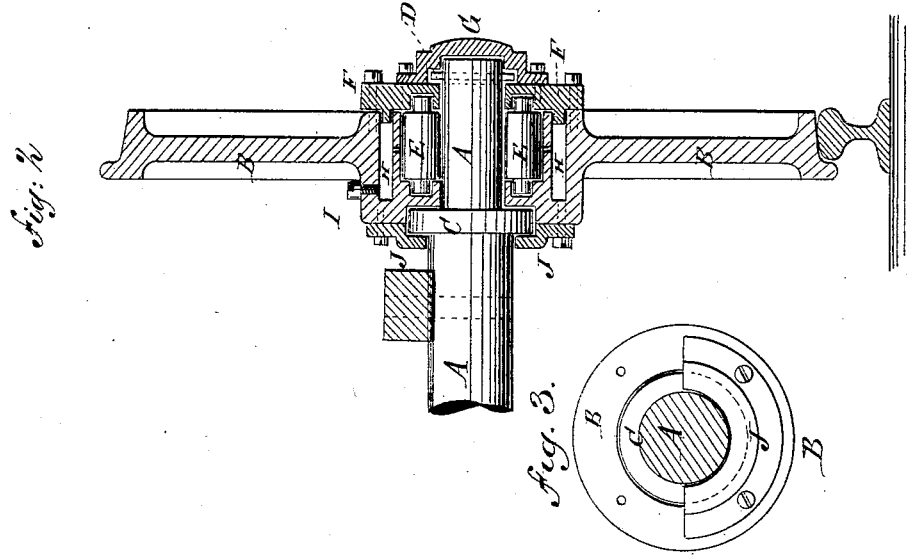
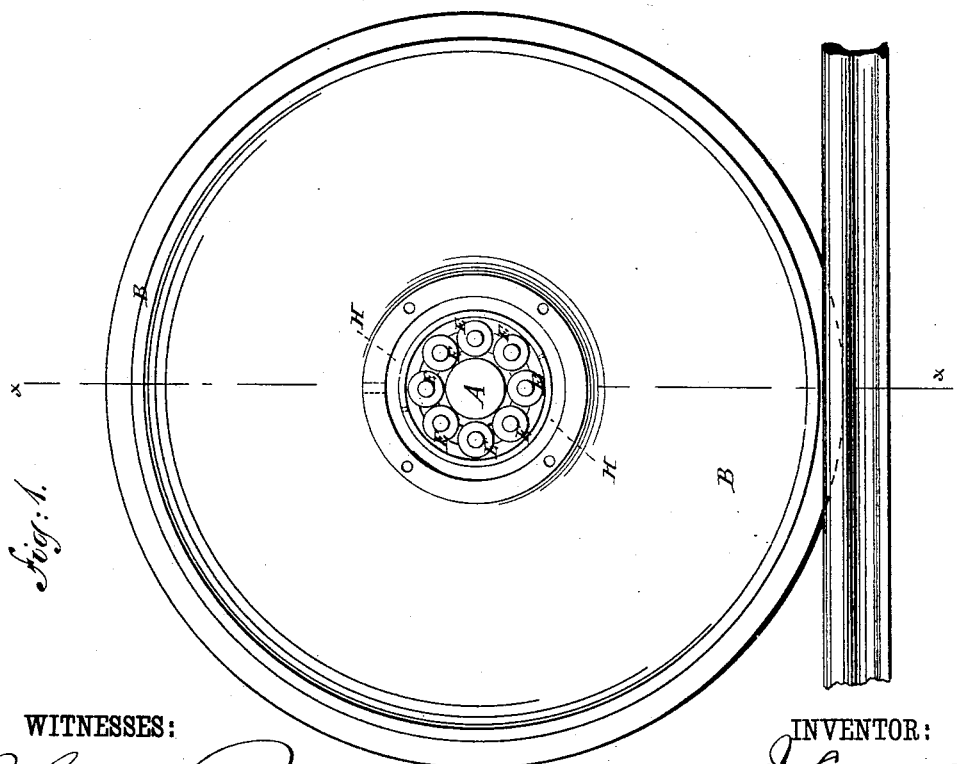
WITNESSES:
Chas. Nida
C. Sedgwick
INVENTOR:
J. Ladner
BY Munn & Co.
ATTORNEYS.

UNITED STATES PATENT OFFICE.

JOHN LADNER, OF CHARLESTOWN, MASSACHUSETTS.

VEHICLE-WHEEL.

SPECIFICATION forming part of Letters Patent No. 234,589, dated November 16, 1880.

Application filed May 22, 1880. (No model.)

*To all whom it may concern:*

Be it known that I, JOHN LADNER, of Charlestown, in the county of Suffolk and State of Massachusetts, have invented a new and useful Improvement in Vehicle-Wheels, of which the following is a specification.

Figure 1 is a side elevation of the improvement. Fig. 2 is a sectional elevation taken through the line $x\ x$, Fig. 1. Fig. 3 is an elevation of the inner end of the wheel-hub, part of the guard-plate being removed.

Similar letters of reference indicate corresponding parts.

The object of this invention is to furnish wheels for cars and other vehicles so constructed as to lessen the friction upon their bearings, and so that they can be kept thoroughly lubricated.

The invention consists in constructing a vehicle-wheel with friction-rollers placed in a countersink in the hub, a ring oil-chamber having holes in its inner wall, the plates that close the outer end of the hub, and the guard-plate attached to the inner end of the hub, whereby the friction is lessened, the bearing kept lubricated, and the escape of oil and the entrance of dust are prevented, as will be hereinafter fully described.

A represents the axle, which is designed to be held stationary, and the journal of which passes through the hub of the wheel B. Upon the axle A, at the inner end of its journal, is formed a collar, C, which fits into a rabbet in the inner end of the hub of the wheel A, to prevent the wheel from moving inward upon the said journal. The wheel is prevented from sliding outward or off the journal by a linchpin, D, passed through the outer end of the said journal.

The hub of the wheel B is countersunk from its outer end to form a chamber to receive a series of friction-rollers, E, the faces of which rest against and roll upon the journal of the axle A.

In the bottom of the chamber or countersink in the hub of the wheel B is formed a ring-groove to receive the journals of the rollers E. The other journals of the rollers E revolve in a ring-groove in a plate, F, bolted to the outer end of the wheel-hub, and which has a hole through its center for the passage of the end of the axle-journal.

The outer end of the journal of the axle A is covered with a cap-plate, G, which is bolted to the plate F. The inner side of the cap-plate G is recessed to receive the end of the journal, and is countersunk to receive the linchpin D.

In the hub of the wheel B, around the chamber in which the friction-rollers E are placed, is formed a ring-chamber, H, to receive the lubricating-oil. The open end of the chamber H is closed by the ring-plate F, and is made more secure against the escape of oil by a ring-flange formed upon the plate F and fitted into the open end of the chamber H, as shown in Fig. 2. The oil is introduced into the chamber H through a hole in the side of the inner end of the wheel-hub, which hole is closed by a screw-plug, I.

The chamber H is designed to be supplied with candle-wick or other similar absorbent material, to hold the oil and conduct the oil through holes in the inner wall of the chamber H to the rollers E, by which it is applied to the journal of the axle A.

The escape of oil at the ends of the hub can be further guarded against by washers of leather or other suitable material interposed between the linchpin D and the plate F, and between the collar C and the bottom of the rabbet in which the said collar works.

The entrance of dust around the collar C is guarded against by a ring-plate, J, bolted to the inner end of the wheel-hub, and which overlaps the said collar C.

For convenience in putting the plate J on and taking it off, it may be made in two parts.

Having thus fully described my invention, I claim as new and desire to secure by Letters Patent—

1. A vehicle-wheel constructed substantially as herein shown and described, consisting of the countersunk hub, the friction-rollers E, the oil-chamber H, the ring-plate F, the cap-plate G, and the guard-plate J, as set forth.

2. In a vehicle-wheel, the combination, with the countersunk hub, of the friction-rollers E, the ring oil-chamber H, and the plates F G, substantially as herein shown and described, whereby the friction is lessened and the bearing kept lubricated, as set forth.

JOHN LADNER.

Witnesses:
PATRICK F. MCGARAGLE,
GEO. E. TARR.